(12) United States Patent
Tanaka

(10) Patent No.: US 8,681,347 B2
(45) Date of Patent: Mar. 25, 2014

(54) IMAGE FORMING APPARATUS AND PROCESSING METHOD THEREOF

(75) Inventor: Hirotomo Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 12/877,039

(22) Filed: Sep. 7, 2010

(65) Prior Publication Data

US 2011/0069330 A1  Mar. 24, 2011

(30) Foreign Application Priority Data

Sep. 18, 2009  (JP) .................................. 2009-218002

(51) Int. Cl.
*G06K 1/00* (2006.01)
*G06F 3/12* (2006.01)

(52) U.S. Cl.
USPC ............................ 358/1.13; 358/1.9; 358/1.15

(58) Field of Classification Search
USPC ............................ 358/512, 515, 521, 1.1–1.9
See application file for complete search history.

(56) References Cited

U.S. PATENT DOCUMENTS

| 5,129,639 A | * | 7/1992 | DeHority | 270/1.01 |
| 5,287,194 A | * | 2/1994 | Lobiondo | 358/296 |
| 2003/0090713 A1 | | 5/2003 | Saito | |
| 2007/0109587 A1 | * | 5/2007 | Yamakawa | 358/1.14 |
| 2007/0263242 A1 | * | 11/2007 | Takahashi | 358/1.14 |
| 2008/0088869 A1 | * | 4/2008 | Unno | 358/1.15 |

FOREIGN PATENT DOCUMENTS

| JP | 2003-084947 | 3/2003 |
| JP | 2007-301911 | 11/2007 |

\* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

A determination is performed as to whether a media setting contained in settings information of an input print job is a standard media setting for which a standard medium is to be used or a custom media setting for which a custom medium different from the standard medium is to be used. Then, in a case where the media setting is determined to be a custom media setting, the media setting is converted to a setting of a medium that can be printed by another image forming apparatus, and the converted media setting is stored.

5 Claims, 22 Drawing Sheets

FIG. 2

FILE(F) EDIT(E) ACTION(A) SERVER(S) WINDOW(W) HELP(H)

☐ BEING SPOOLED  ☐ SPOOLED / IN STANDBY  ☐ IN PROCESS / CONTINUATION  ☐ BEING PROCESSED  ☐ PROCESSED / IN STANDBY  ☐ STANDBY FOR PRINTING  ☐ BEING PRINTED

PRINT  STANDBY  PROCESS AND STANDBY  DELETE  ARCHIVE(A)  PREVIEW  PROPERTIES(O)

ACTIVE JOB — 201

TOTAL JOBS [7]  STANDBY JOB(S) [7]

| JOB STATUS | JOB NAME | ORDER | CUSTOM MEDIA AVAILABLE | USER | DATE / TIME | PAGE |
|---|---|---|---|---|---|---|
| STANDBY | JOB_001 | | | USER_A | 2008/11/28 11:14:38 | 108 |
| STANDBY | JOB_002 | | | USER_A | 2008/12/02 20:31:30 | 1 |
| STANDBY | JOB_003 | | | USER_B | 2008/12/02 16:21:14 | 3 |
| STANDBY | JOB_003 | | | USER_B | 2008/12/02 16:21:14 | 3 |
| STANDBY | JOB_004 | | | USER_C | 2008/12/01 20:37:43 | 1 |
| STANDBY | JOB_005 | | | USER_C | 2008/12/01 12:30:21 | 1 |
| STANDBY | JOB_006 | | | USER_C | 2008/12/01 9:52:50 | 1 |

— 203

PRINTED JOBS

TOTAL JOBS [99]

| JOB NAME | USER | DATE / TIME | NUMBER OF COPIES | SIZE | SERVER |
|---|---|---|---|---|---|
| ... | ... | ... | ... | ... | ... |

— 202

PRINTED JOBS / ARCHIVE / Freeform / JOB LOG

ACTIVITY

▽ BEING SPOOLED

▽ BEING PROCESSED

▽ BEING PRINTED

USABLE

▽ GENERAL INFORMATION

HARD DISK DRIVE
0  25  50  75  100

MEMORY
0  25  50  75  100

MAPPING TABLE

| TYPE | SURFACE PROPERTY | GRAMMAGE | | | |
|---|---|---|---|---|---|
| | | 52~63 | 64~79 | 80~105 | 106~128 |
| NORMAL | HIGH QUALITY PAPER | THIN PAPER 57(52~63) | THIN PAPER (64~79) | PLAIN PAPER (80~105) | THICK PAPER (106~128) |
| | HIGH QUALITY PAPER | | COLOR PAPER (64~79) | | |
| | RECYCLED PAPER | | RECYCLED PAPER (64~79) | RECYCLED PAPER 2 (80~105) | THICK PAPER (106~128) |
| | SINGLE-SIDED COAT | | | SINGLE-SIDED COAT 1 (80~105) | SINGLE-SIDED COAT 2 (106~128) |
| | DOUBLE-SIDED COAT | | | DOUBLE-SIDED COAT 1 (80~105) | DOUBLE-SIDED COAT 2 (106~128) |
| | EMBOSSED | | (EMBOSSED PAPER) (64~79) | EMBOSSED PAPER (80~105) | EMBOSSED PAPER 2 (106~128) |
| | VELLUM | | (VELLUM PAPER) (64~79) | VELLUM PAPER (80~105) | VELLUM PAPER 2 (106~128) |
| | FILM | | | OHP | |
| | LABEL | | | LABEL PAPER | |
| | COTTON | | (BONDED PAPER) (64~79) | BONDED PAPER 85(80~105) | (BONDED PAPER) (106~300) |
| | POSTCARD | | | POSTCARD | |
| TAB PAPER | HIGH QUALITY PAPER | | | (INDEX PAPER) (64~150) | |
| | OTHER PAPER | | | (INDEX PAPER) (OTHER GRAMMAGE) | |
| PUNCHED PAPER | HIGH QUALITY PAPER | | PUNCHED PAPER 1 (64~79) | PUNCHED PAPER 2 (80~105) | (PUNCHED PAPER) (106~256) |
| | OTHER PAPER | | (PUNCHED PAPER) (OTHER GRAMMAGE) | | |

FIG. 7B

| GRAMMAGE | | | | | |
|---|---|---|---|---|---|
| 129~150 | 151~180 | 181~209 | 210~256 | 257~300 | |
| THICK PAPER 2 (129~150) | THICK PAPER 3 (151~180) | THICK PAPER 4 (181~209) | THICK PAPER 5 (210~256) | THICK PAPER 6 (257~300) | |
| THICK PAPER 2 (129~150) | THICK PAPER 3 (151~180) | THICK PAPER 4 (181~209) | RECYCLED PAPER 3 (210~256) | THICK PAPER 6 (257~300) | |
| SINGLE-SIDED COAT 3 (129~150) | SINGLE-SIDED COAT 4 (151~180) | SINGLE-SIDED COAT 5 (181~209) | SINGLE-SIDED COAT 6 (210~256) | SINGLE-SIDED COAT 7 (257~300) | |
| DOUBLE-SIDED COAT 3 (129~150) | DOUBLE-SIDED COAT 4 (151~180) | DOUBLE-SIDED COAT 5 (181~209) | DOUBLE-SIDED COAT 6 (210~256) | DOUBLE-SIDED COAT 7 (257~300) | |
| EMBOSSED PAPER 3 (129~150) | EMBOSSED PAPER 4 (151~180) | EMBOSSED PAPER 5 (181~209) | EMBOSSED PAPER 6 (210~256) | EMBOSSED PAPER 7 (257~300) | |
| (VELLUM PAPER) (129~150) | (VELLUM PAPER) (151~180) | (VELLUM PAPER) (181~209) | (VELLUM PAPER) (210~256) | (VELLUM PAPER) (257~300) | |
| | | OHP | | | |
| | | LABEL PAPER (BONDED PAPER) (106~300) | | | |
| | | POSTCARD | | | |
| | INDEX PAPER 1 (151~180) | INDEX PAPER 2 (181~209) | (INDEX PAPER) (OTHER GRAMMAGE) | | |
| (INDEX PAPER) (64~150) | | | | | |
| (PUNCHED PAPER) (106~256) | | | (PUNCHED PAPER) (OTHER GRAMMAGE) | | |

FIG. 9

THE ARCHIVED JOB WILL BE CONVERTED TO STANDARD SETTINGS. OK?

FIG. 10

F I G. 12
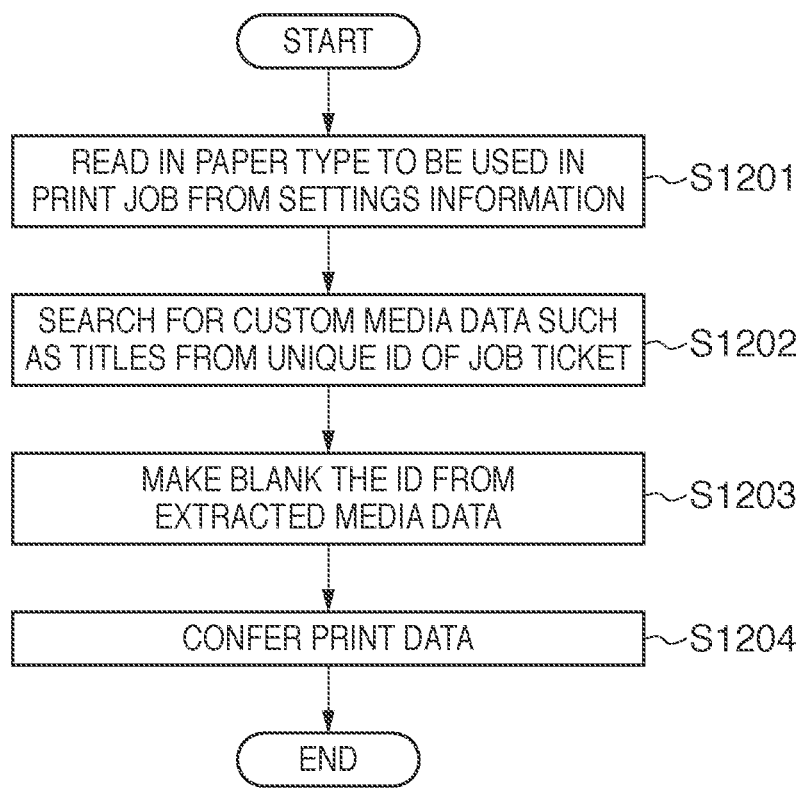

FILE(F) EDIT(E) ACTION(A) SERVER(S) WINDOW(W) HELP(H)

☐ BEING SPOOLED  ☐ SPOOLED/IN STANDBY  ☐ IN PROCESS CONTINUATION  ☐ BEING PROCESSED  ☐ PROCESSED  ☐ STANDBY FOR PRINTING  ☐ BEING PRINTED

PRINT  STANDBY  PROCESS AND STANDBY  DELETE  ARCHIVE(A)  PREVIEW  PROPERTIES(O)

ACTIVE JOB

| JOB STATUS... | JOB NAME | | | | | | |
|---|---|---|---|---|---|---|---|

TOTAL JOBS [12]  STANDBY JOB(S) [12]  ▽ ACTIVITY  ▽ BEING SPOOLED

| ORDER | PREFLIGHT | USER | DATE/TIME |
|---|---|---|---|

THE DATA THAT HAS BEEN READ IN IS PRINT DATA APPENDED WITH CUSTOM MEDIA DATA. OK TO ADD CUSTOM MEDIA DATA?

[ No ]   [ Yes ]

0  25  50  75  100
0  25  50  75  100

▦ PRINTED JOBS

| JOB NAME | USER | | | | | | |
|---|---|---|---|---|---|---|---|

PRINTED JOBS / ARCHIVE / Freeform / JOB LOG

FIG. 18

FILE(F) EDIT(E) ACTION(A) SERVER(S) WINDOW(W) HELP(H)

☐ BEING SPOOLED  ☐ SPOOLED/IN STANDBY  ☐ IN PROCESS CONTINUATION  ☐ BEING PROCESSED  ☐ PROCESSED/IN STANDBY  ☐ STANDBY FOR PRINTING  ☐ BEING PRINTED

PRINT  STANDBY  PROCESS AND STANDBY  DELETE  ARCHIVE(A)  PREVIEW  PROPERTIES(O)

ACTIVE JOB  TOTAL JOBS [7]  STANDBY JOB(S) [7]

| JOB STATUS | JOB NAME | ORDER | HAS CUSTOM MEDIA [DATA] | USER | DATE/TIME | PAGE |
|---|---|---|---|---|---|---|
| STANDBY | JOB_001 | | | USER_A | 2008/11/28 11:14:38 | 108 |
| STANDBY | JOB_002 | | ✓ | USER_A | 2008/12/02 20:31:30 | 1 |
| STANDBY | JOB_003 | | | USER_B | 2008/12/02 16:21:14 | 3 |
| STANDBY | JOB_003 | | | USER_B | 2008/12/02 16:21:14 | 3 |
| STANDBY | JOB_004 | | | USER_C | 2008/12/01 20:37:43 | 1 |
| STANDBY | JOB_005 | | | USER_C | 2008/12/01 12:30:21 | 1 |
| STANDBY | JOB_006 | | | USER_C | 2008/12/01 9:52:50 | 1 |

1801

PRINTED JOBS  TOTAL JOBS [99]

| JOB NAME | USER | DATE/TIME | NUMBER OF COPIES | SIZE | SERVER |
|---|---|---|---|---|---|

PRINTED JOBS / ARCHIVE / Freeform / JOB LOG

ACTIVITY

▽ BEING SPOOLED

▽ BEING PROCESSED

▽ BEING PRINTED

USABLE

▽ GENERAL INFORMATION

HARD DISK DRIVE
0  25  50  75  100

MEMORY
0  25  50  75  100

F I G. 19
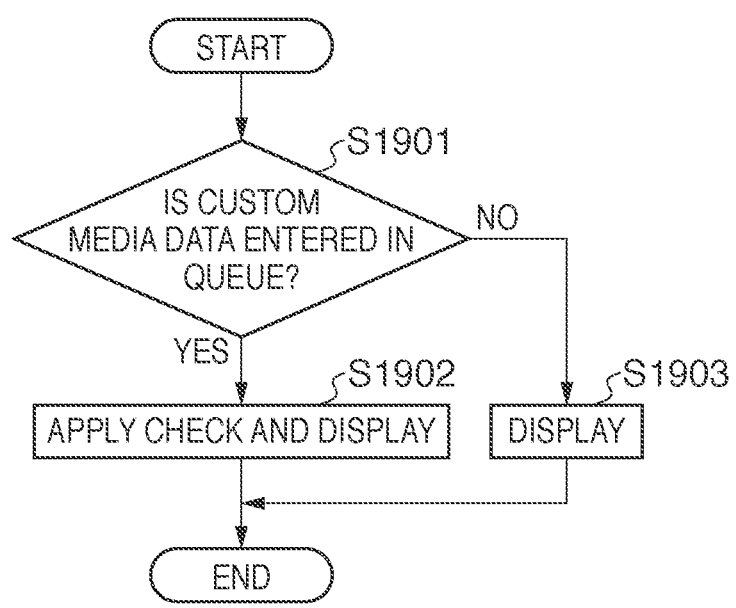

FIG. 20

| FILE(F) | EDIT(E) | ACTION(A) | SERVER(S) | WINDOW(W) | HELP(H) |

☐ BEING SPOOLED  ☐ SPOOLED/IN STANDBY  ☐ IN PROCESS CONTINUATION  ☐ BEING PROCESSED  ☐ PROCESSED  ☐ STANDBY FOR PRINTING  ☐ BEING PRINTED

PRINT  STANDBY  PROCESS AND STANDBY  DELETE  ARCHIVE(A)  PREVIEW  PROPERTIES(O)

ACTIVE JOB

TOTAL JOBS [7]  STANDBY JOB(S) [7]

| JOB STATUS | JOB NAME | ORDER | CUSTOM MEDIA AVAILABLE | USER | DATE/TIME | PAGE |
|---|---|---|---|---|---|---|
| STANDBY | JOB_001 | | | USER_A | 2008/11/28 11:14:38 | 108 |
| STANDBY | JOB_002 | | | A | 2008/12/02 20:31:30 | 1 |
| STANDBY | JOB_003 | | | B | 2008/12/02 16:21:14 | 3 |
| STANDBY | JOB_003 | | | B | 2008/12/02 16:21:14 | 3 |
| STANDBY | JOB_004 | | | C | 2008/12/01 20:37:43 | 1 |
| STANDBY | JOB_005 | | | C | 2008/12/01 12:30:21 | 1 |
| STANDBY | JOB_006 | | | C | 2008/12/01 9:52:50 | 1 |

2001

| PRINT | Ctrl+P |
| DELETE | Del |
| DUPLICATE | Ctrl+D |
| RENAME | Ctrl+R |
| PROCESS AND STANDBY | Ctrl+Alt+P |
| PRINT AND STANDBY | Ctrl+Shift+P |
| PROPERTIES | |
| PREVIEW | Ctrl+Shift+V |
| REGISTER CUSTOM MEDIA DATA | |
| ARCHIVE | |
| IMPOSITION | |
| PRINTING SCHEDULE | |
| INTERRUPT PRINTING | |
| Quick Doc Merge... | |

PRINTED JOBS

| JOB NAME | USER | SIZE | SERVER |
|---|---|---|---|

TOTAL JOBS [99]

PRINTED JOBS / ARCHIVE / Freeform / JOB LOG

ACTIVITY

▽ BEING SPOOLED
▽ BEING PROCESSED
▽ BEING PRINTED
USABLE
▽ GENERAL INFORMATION

HARD DISK DRIVE
0  25  50  75  100

MEMORY
0  25  50  75  100

IMAGE FORMING APPARATUS AND PROCESSING METHOD THEREOF

BACKGROUND OF THE INVENTION

1. Field of the Invention

The present invention relates to image forming apparatuses and processing methods thereof for printing based on print jobs.

2. Description of the Related Art

In print systems of recent years it has been common to store printed job data in a large capacity storage device (HDD) or the like so that it is unnecessary to perform settings again for a print job when reprinting that job. Print jobs are created by using a printer driver to convert data, which has been generated using application software such as document creation software and spreadsheet software or the like, to printer control language data. Then, this print job is transferred via a printer server or directly to a printer, and print output processing is carried out by that printer.

In this case, the print job that has been used once and input from a data supply source is kept stored in a storage device that is installed in the apparatus itself or that is connected externally, or in a server device connected to a network (for example, a print server). Apparatuses have been proposed that are provided with a function in which, in a case where there is an instruction to re-output the print job after this, the print job that has been kept stored is used to generate and output an image in the image forming apparatus.

With this function that carries out re-output, when it is necessary to again output a print job that has already been transmitted once, it is no longer necessary to use the driver the regenerate and resend the print data. For this reason, the efficiency in processing for re-output can be improved, and it is also possible to achieve greater speed in output and reduce the load on the network.

However, since device usage limitations and parameter settings of print jobs are not common among multiple print systems, job settings cannot be reused as they are, and improvements are required.

In order to solve these limitations, substitute printing has been proposed (for example, see Japanese Patent Laid-Open No. 2003-84947) in which a device of a different capability is used by reducing the usage limitations of the device by holding in a print server differences among the image forming apparatuses such as the presence/absence of paper supply, paper discharge devices, and double-sided options.

Furthermore, due to demands from the recent POD market, print systems have been proposed (for example, see Japanese Patent Laid-Open No. 2007-301911) in which custom media other than standard media can be used as a method of specifying papers to be selected for a print job. Here, standard media refers to conventional standard papers such as plain papers and recycled papers used in copiers. Furthermore, custom media refers to custom papers sold by manufacturers, with the characteristics of the papers (grammage and surface properties and the like) registered in a database as parameters (attribute values). Standard media and custom media together are simply referred to as media.

When forming images on papers generally stored in a sheet feeding unit, an image forming apparatus carries out image forming at an optimal speed and fixing unit temperature according to the size and type of those papers. Furthermore, to loosen any adherence between sheets when feeding papers, a function is provided that blows air at an appropriate strength and time for the papers. By using custom media, a user becomes able to carry out appropriate fixing unit temperatures and paper handling for purchased papers, and the user can produce printed matter in a favorable environment.

Unfortunately, on the other hand, paper types that are controllable by image forming apparatuses and media for carrying out optimal image forming have undergone extensive diversification and there are many more types available, such that the number of media used by users has greatly increased. Consequently, a configuration has been proposed in recent print systems in which, instead of preparing all media information in advance on the print system side, the user is able to perform settings using a user interface provided in the image forming apparatus. Further still, configurations have also been proposed in which attribute values of each type of paper are set from a personal computer connected via a network.

The aforementioned standard media are held in advance in the image forming apparatuses, and are common in description among the image forming apparatuses. That is, common standard media settings are used for the print data of stored (archived) print jobs for which standard media were used, and therefore these can be input to a different image forming apparatus and outputted without problem.

However, there is a problem that information sharing cannot be achieved in image forming apparatuses that use a different database than the database in which the print data was archived in regard to the print data of print jobs for which custom media were used, which are managed using a unique ID for each image forming apparatus.

SUMMARY OF THE INVENTION

The present invention provides an apparatus and method in which mutual use is possible without limitations even in a case where different custom media are used in a print job for each image forming apparatus.

According to one embodiment of the present invention, there is provided an image forming apparatus for printing based on a print job, comprising: a determination unit that determines whether a media setting contained in settings information of an input print job is a standard media setting for which a standard medium is to be used or a custom media setting for which a custom medium different from the standard medium is to be used, a conversion unit that, in a case where the media setting is determined by the determination unit to be the custom media setting, converts the media setting to a setting of a medium that can be printed by another image forming apparatus, and a storage unit that stores the media setting that has been converted by the conversion unit.

Further features of the present invention will become apparent from the following description of exemplary embodiments (with reference to the attached drawings).

BRIEF DESCRIPTION OF THE DRAWINGS

FIG. 2 is a diagram showing one example of a UI screen displayed on a display unit 112.

FIG. 3 is a diagram showing one example of a UI screen when carrying out archiving of a print job.

FIG. 4 is a diagram showing one example of a UI screen in which archive job settings are carried out.

FIGS. 7A and 7B are diagrams showing one example of a configuration of a mapping table.

FIG. 9 is a diagram showing one example of a warning screen when storing after converting to standard media settings.

FIG. 10 is a diagram showing one example of a warning screen in a case where corresponding standard media are not available.

FIG. 12 is a flowchart showing a process of conferring custom media data.

FIG. 13 is a diagram showing a UI screen in which an import of an archived job is carried out by a status display application.

FIG. 16 is a diagram showing one example of a warning screen in a case of a job appended with custom media data.

FIG. 18 is a diagram showing a state on the UI screen in which print data appended with custom media data has been read in.

FIG. 19 is a flowchart showing a process of displaying print data appended with custom media data.

FIG. 20 is a diagram showing a UI screen when registering custom media data.

DESCRIPTION OF THE EMBODIMENTS

Hereinafter, detailed description of an embodiment for executing the present invention is given with reference to the accompanying drawings. In the present embodiment, description is given of processing in a case where custom media is selected from an image forming apparatus (constituted by a controller and a copier) on a network and the printed print job is stored (archived) and retrieved to be reprinted by another image forming apparatus.

Inputting of Print Job

Figure 1:
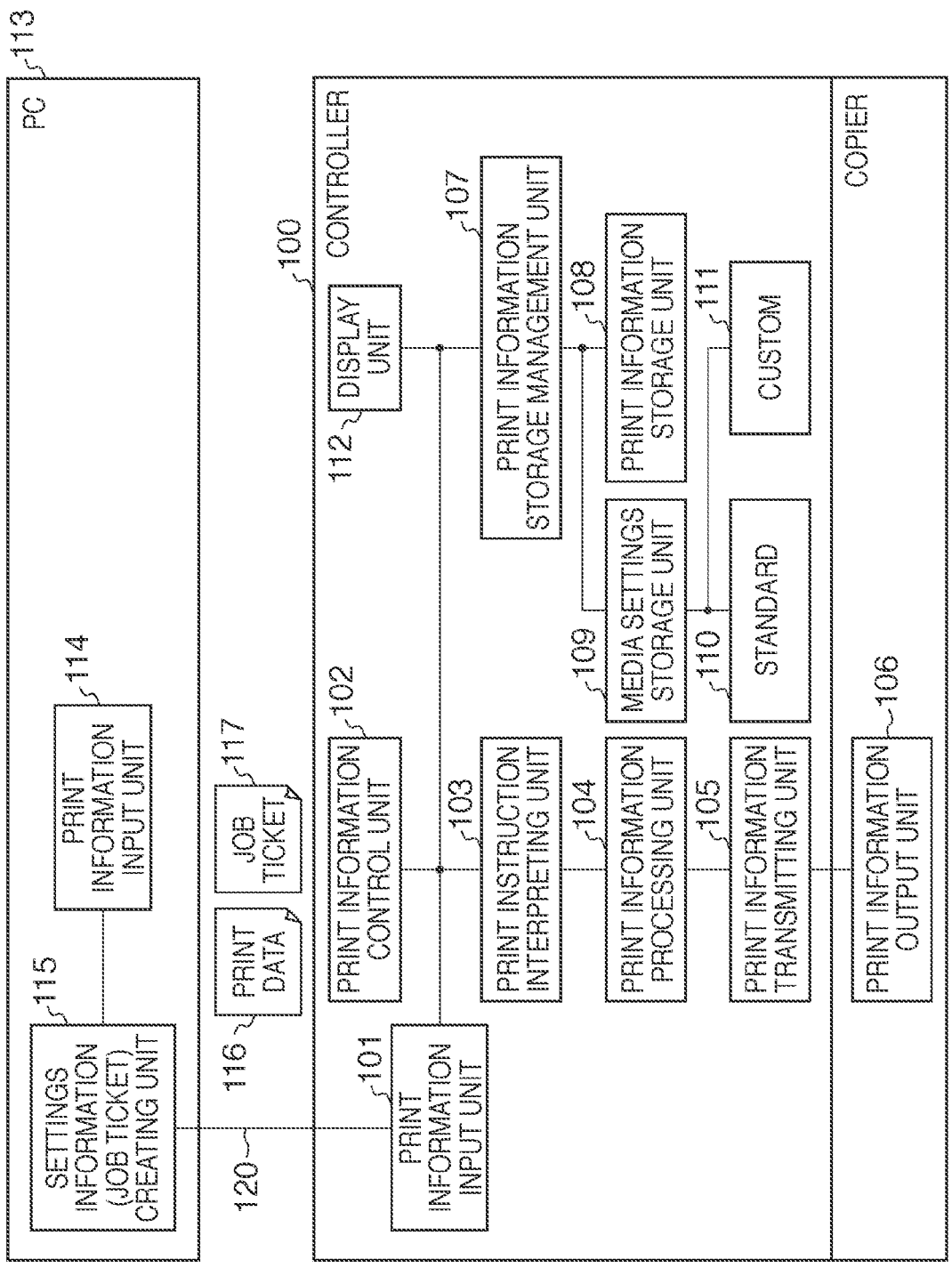
FIG. 1 is a block diagram showing one example of a configuration of a print system according to the present embodiment.

FIG. 1 is a block diagram showing one example of a configuration of a print system according to the present embodiment. As shown in FIG. 1, the print system is constituted by a personal computer (PC) 113 and an image forming apparatus 100, which is constituted by a controller and a copier, connected on a network 120.

The PC 113 includes a print information input unit 114, which is a user interface for carrying out various settings of printing, and a settings information creating unit 115 for creating settings information. Here, the settings information is referred to as a job ticket, and a set of print data 116 and a job ticket 117 is referred to as a print job. Image information of a printed matter is contained in the print data 116, and layout information of the print job (such as specifications for single-sided or double-sided printing, imposition information, number of copies, sheet size, and paper type) is written in the job ticket 117.

When an instruction for printing is carried out from a printing application or the like installed in the PC 113, a printer driver (hereinafter, driver) corresponding to the image forming apparatus 100 generates a print job. Then, the print job is outputted to the image forming apparatus 100 via the network 120. Here, the driver is software that is activated when a user carries out printing in a printing application.

By carrying out bi-directional communication with the image forming apparatus 100, the driver displays custom media information on a user interface (UI) of the driver. When a custom media setting displayed on a screen of the UI is selected, the driver inputs to the image forming apparatus 100 the print job, in which is embedded a unique ID of the custom media of the paper type, and a job ticket 117, which is settings information.

Processing in the Image Forming Apparatus after Input of a Print Job

In the present embodiment, although description is given of an example of a case where a controller, which controls image forming, and a copier, which carries out print output, are directly connected as the image forming apparatus 100, the controller and copier may be connected on a network. In such a case, a media settings storage unit 109 may be provided in common to both the controller and copier. Here, the media settings storage unit 109 includes a database constituted by a standard 110 and a custom 111.

The print data 116 of the document to be printed and the job ticket 117, which instructs the processing, display, and output of the print data, are input from the driver of the PC 113 to a print information input unit 101 of the image forming apparatus 100. The received print job is temporarily stored in a print information storage unit 108. A print information control unit 102 controls image forming based on the print information of the set of the job ticket 117 and the print data 116. Furthermore, included in the print information control unit 102 are a CPU that performs overall control of the image forming apparatus, a ROM in which programs and control data and the like of the CPU are stored, and a RAM in which a work area and various tables and the like are defined, which are used when the CPU executes various types of processing described later. A print instruction interpreting unit 103 interprets the job ticket 117. A custom media setting that indicates a type of paper is embedded in the job ticket 117 using a unique ID. Furthermore, the print instruction interpreting unit 103 interprets intricate settings for each medium by communicating with the media settings storage unit 109.

Based on a result of the interpretation by the print instruction interpreting unit 103, a print information processing unit 104 generates print information from the print data 116 and carries out preparation for output by processing the job ticket 117. A print information transmitting unit 105 transmits the print information that has been processed by the print information processing unit 104 to a print information output unit 106. Then, the print information output unit 106 carries out printing by referencing the custom media settings stored in the media settings storage unit 109. It should be noted that outputted print jobs and print jobs stored in the print information storage unit 108 are presented to the user via a display unit 112.

Display of Print Job

The display unit 112 of the controller displays a status of print jobs in the image forming apparatus 100 as a UI screen shown in FIG. 2. Also, the display unit 112 may give notification via the network 120 of the status of print jobs to a status display application or the like installed on the PC 113 and cause this to be as a UI screen on the status display application.

FIG. 2 is a diagram showing one example of a UI screen displayed on the display unit 112. As shown in FIG. 2, the UI screen contains an active job screen 201 that displays the status of multiple print jobs. Furthermore, in the example of FIG. 2, a "printed jobs" tab 202 is specified and printed jobs are also displayed.

In the present embodiment, the status of print jobs is expressed by multiple icon parts 203 for each queue. Types of queues include a print queue of print jobs input from the driver of the PC 113 to be printed via the print information storage unit 108, and a hold queue of input print jobs to be temporarily held in the print information storage unit 108. It should be noted that a print information storage management unit 107 under the control of the print information control unit 102 manages the print information storage unit 108 and the aforementioned media settings storage unit 109.

Print jobs input from the PC 113 are displayed in the active job screen 201 while being processed in the image forming apparatus 100. Then, the data of print jobs for which printing has been finished is moved to the printed jobs screen 202. Furthermore, there is also a job log screen that displays results (OK and NG or the like) of print jobs after printing.

Archiving of Print Jobs

Here, description is given of a process in which an arbitrary print job displayed in the active job screen 201 is archived, and the archived print job is read in (imported) by another image forming apparatus. First, description is given of a process in which the media settings of a print job to be archived are confirmed to perform archiving.

Figure 3:
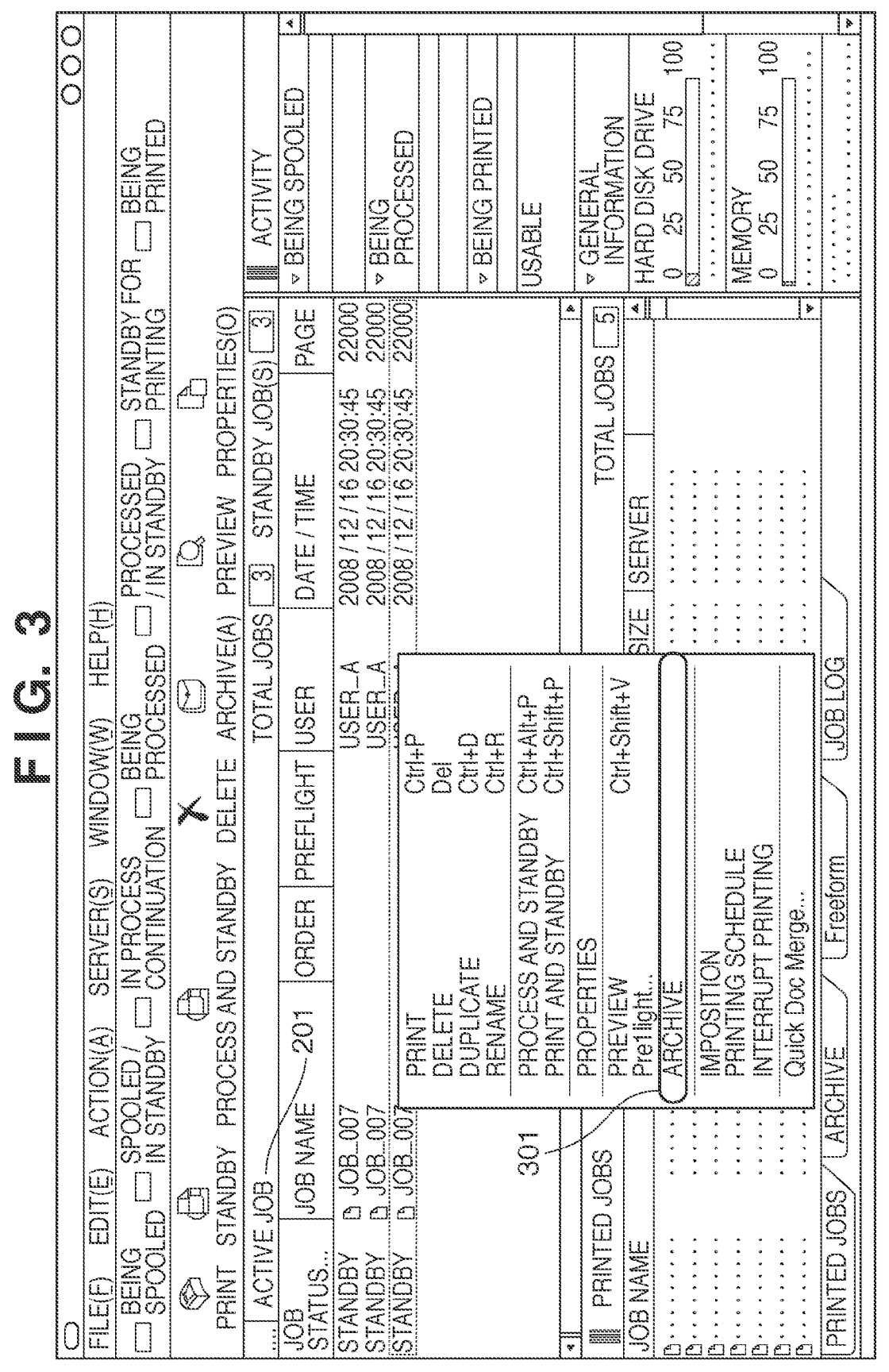

FIG. 3 is a diagram showing one example of a UI screen when carrying out archiving of a print job. After the user selects a print job to be archived from the active job screen 201 using a pointing device such as a mouse, archive 301 is selected from a menu displayed by a right click or the like.

Figure 4:
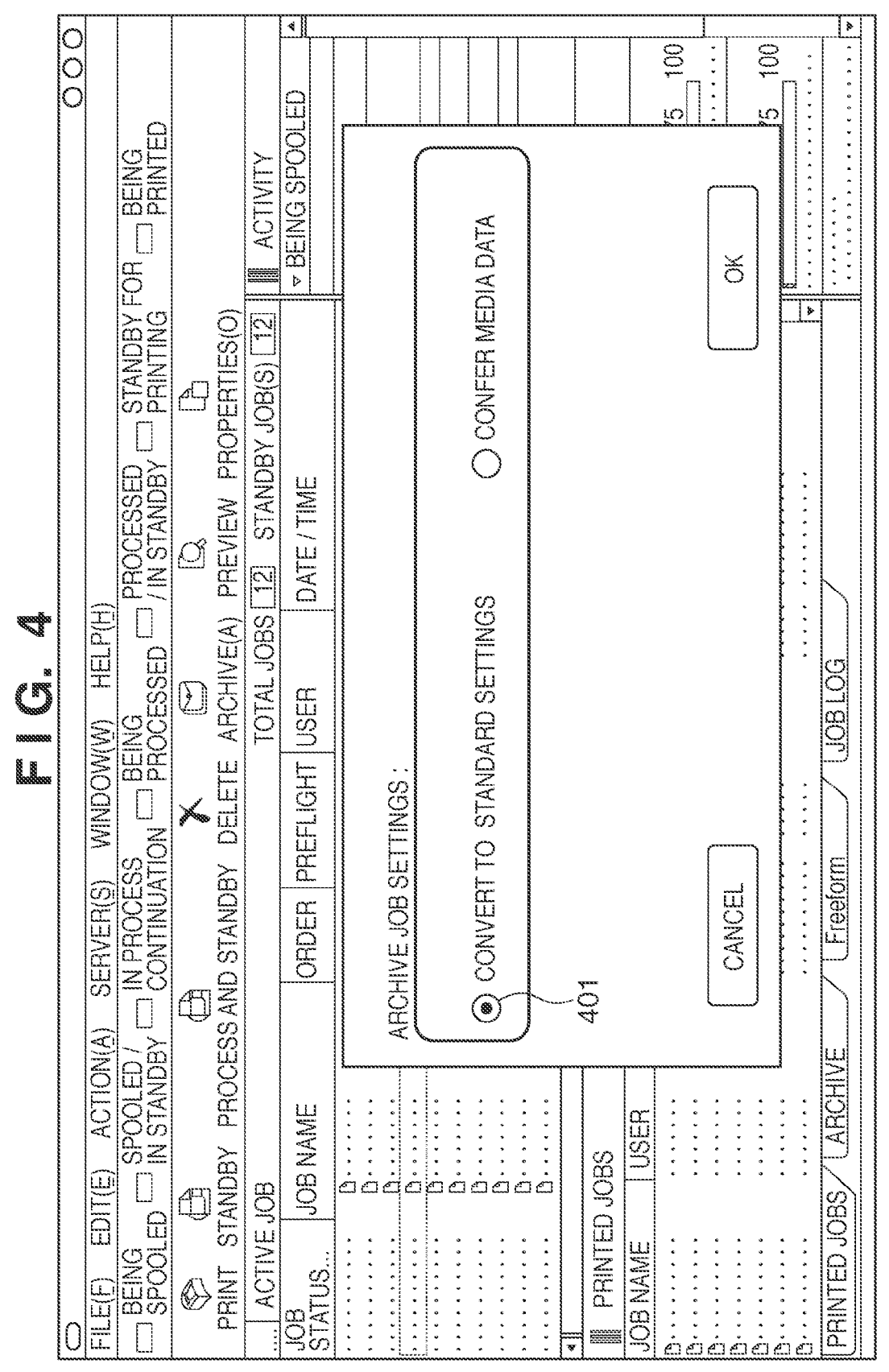
Figure 5:
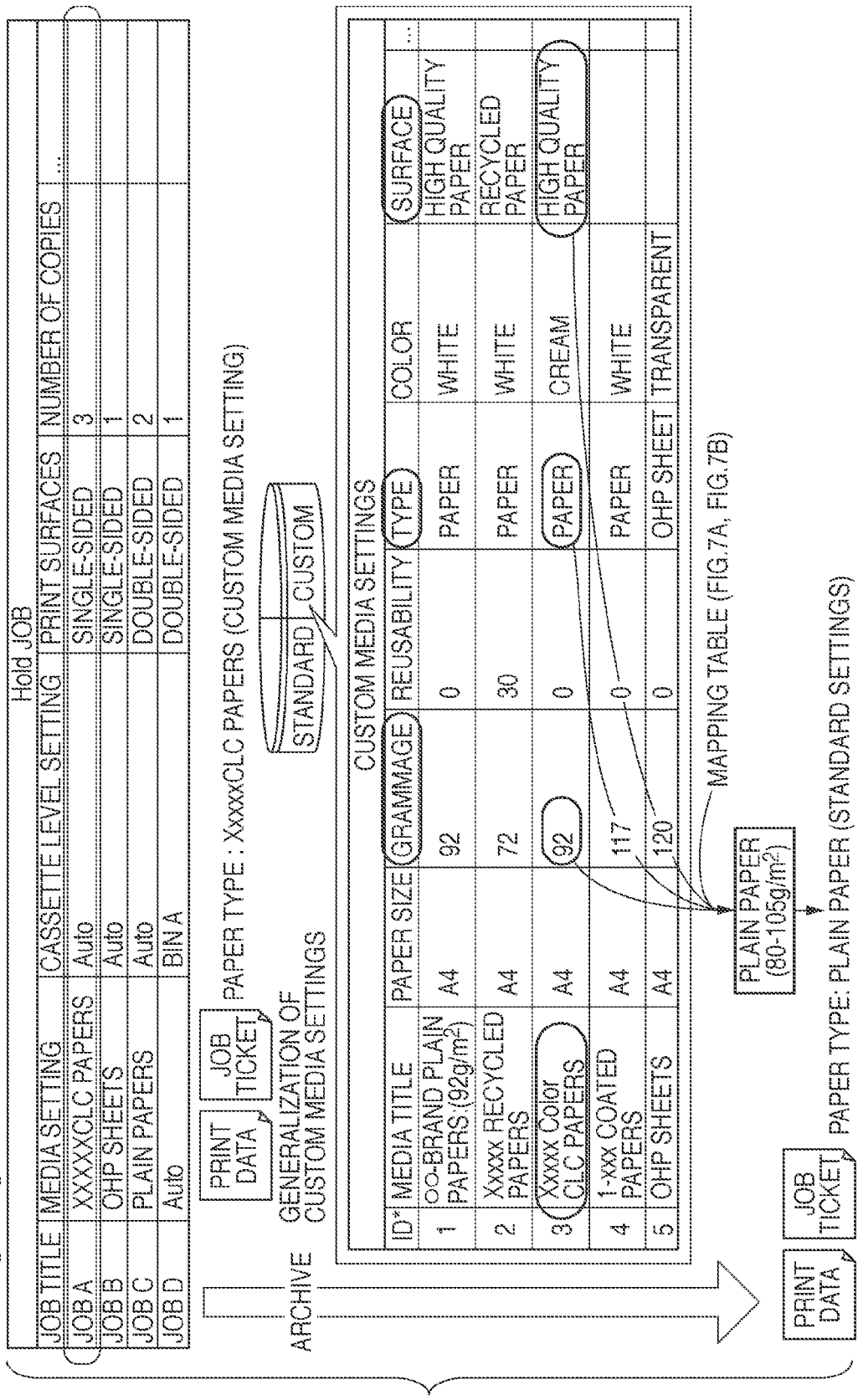
FIG. 5 is a diagram showing a concept of a process in which custom media settings are converted to standard media settings.
Figure 6:
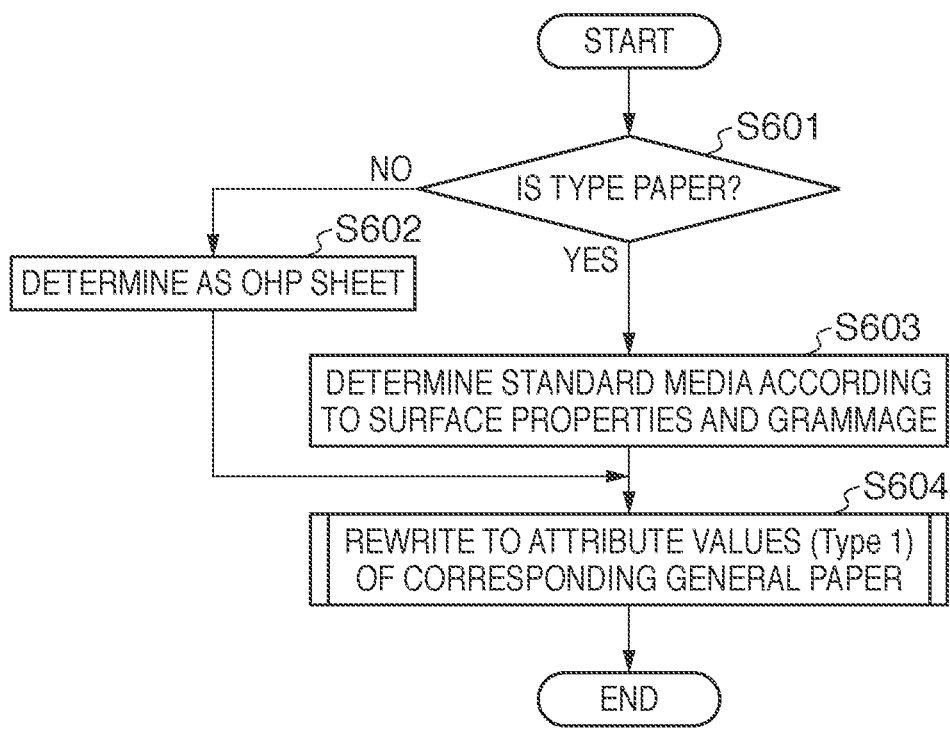
FIG. 6 is a flowchart showing conversion to standard media settings.

When the conventional embedding of a media ID in the job ticket is included, there are three types of archiving print jobs. In the present embodiment, a priority storage format can be set as desired by the user. Here, as shown in FIG. 4, a "convert to standard settings" 401 is specified as an initial setting in carrying out a conversion to standard media settings as the archive job setting. However, "confer media data" can also be specified in response to the user's wishes. Conversion to standard media settings FIG. 5 is a diagram showing a concept of a process in which custom media settings are converted to standard media settings. FIG. 6 is a flowchart showing conversion to standard media settings. First, when the archive 301 process is selected in the UI screen shown in FIG. 3, the print instruction interpreting unit 103 confirms the custom media settings in S601. Here, the print instruction interpreting unit 103 confirms the media setting (ID of paper type) that is embedded in the job ticket. In a case where the ID of paper type is interpreted to be OHP sheet as a result of the confirmation, processing proceeds to S602 and determines as OHP sheet. Furthermore, in a case where this is interpreted to be custom media, the process proceeds to S603 and standard media is determined in response to a texture (surface property) of the paper surface and weight of paper (grammage). Then, in S604, this is rewritten to attribute values (type 1) of a corresponding general paper.

Specifically, a mapping table shown in FIGS. 7A and 7B is used to confirm whether or not it can be assigned as standard media. A mapping table expresses correspondence relationships of type, surface properties, grammage, and standard media settings for each image forming apparatus. In the present embodiment, the type, surface properties, and grammage of a media are used for determining which standard media that media can be converted to. Furthermore, standard media refers to a method of classifying paper types held in advance by a copier at the time of manufacture and these are prepared in common for each model (such as plain paper, recycled paper, single-sided coated paper, and the like).

Figure 8:
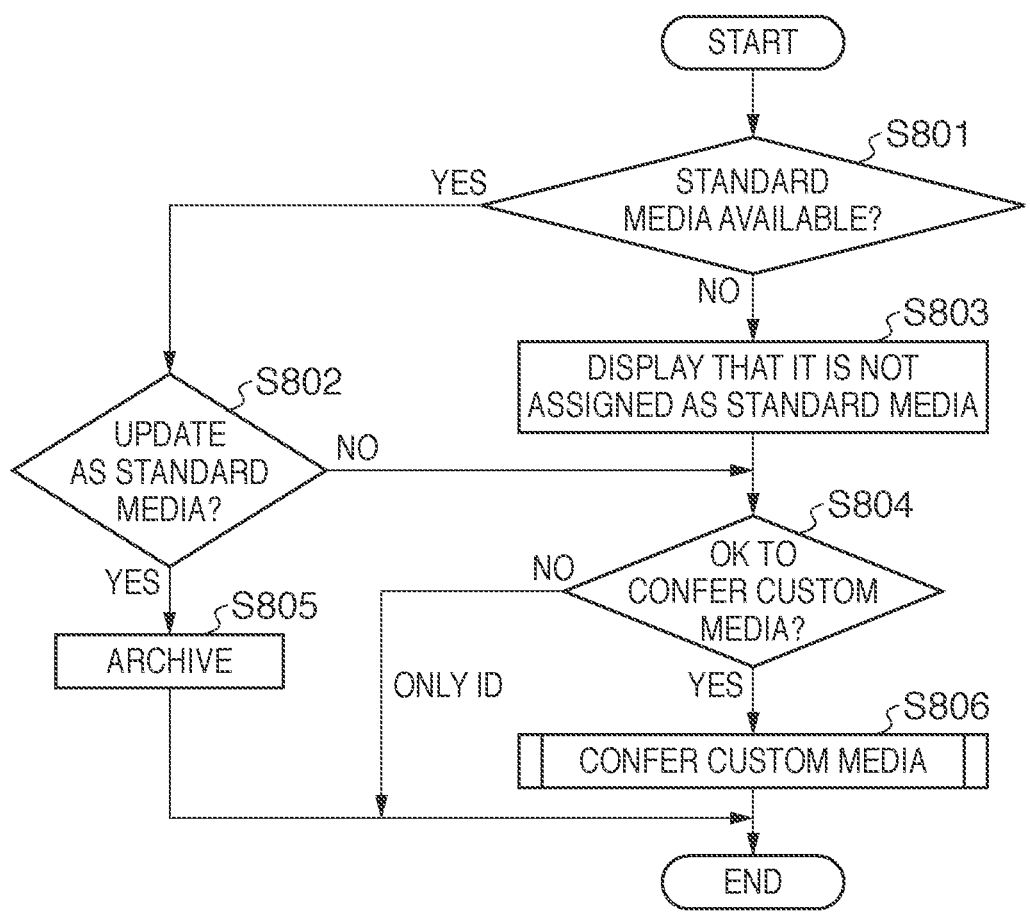
FIG. 8 is a flowchart showing an archiving process of custom media settings that have been converted to standard media settings.

Next, description is given using FIG. 8 of an archiving process of custom media settings that have been converted to standard media settings. First, in S801, a determination is performed as to whether or not standard media corresponding to the custom media are available. In a case where these are available as a result of the determination, processing proceeds to S802 and whether to store by converting to standard media is displayed as a warning screen as shown in FIG. 9. In a case where OK is selected at this warning screen, processing proceeds to S805 and a standard media ID is embedded in the job ticket. Furthermore, in a case where cancel is selected at this warning screen, processing proceeds to S804, which is described later.

Figure 10:
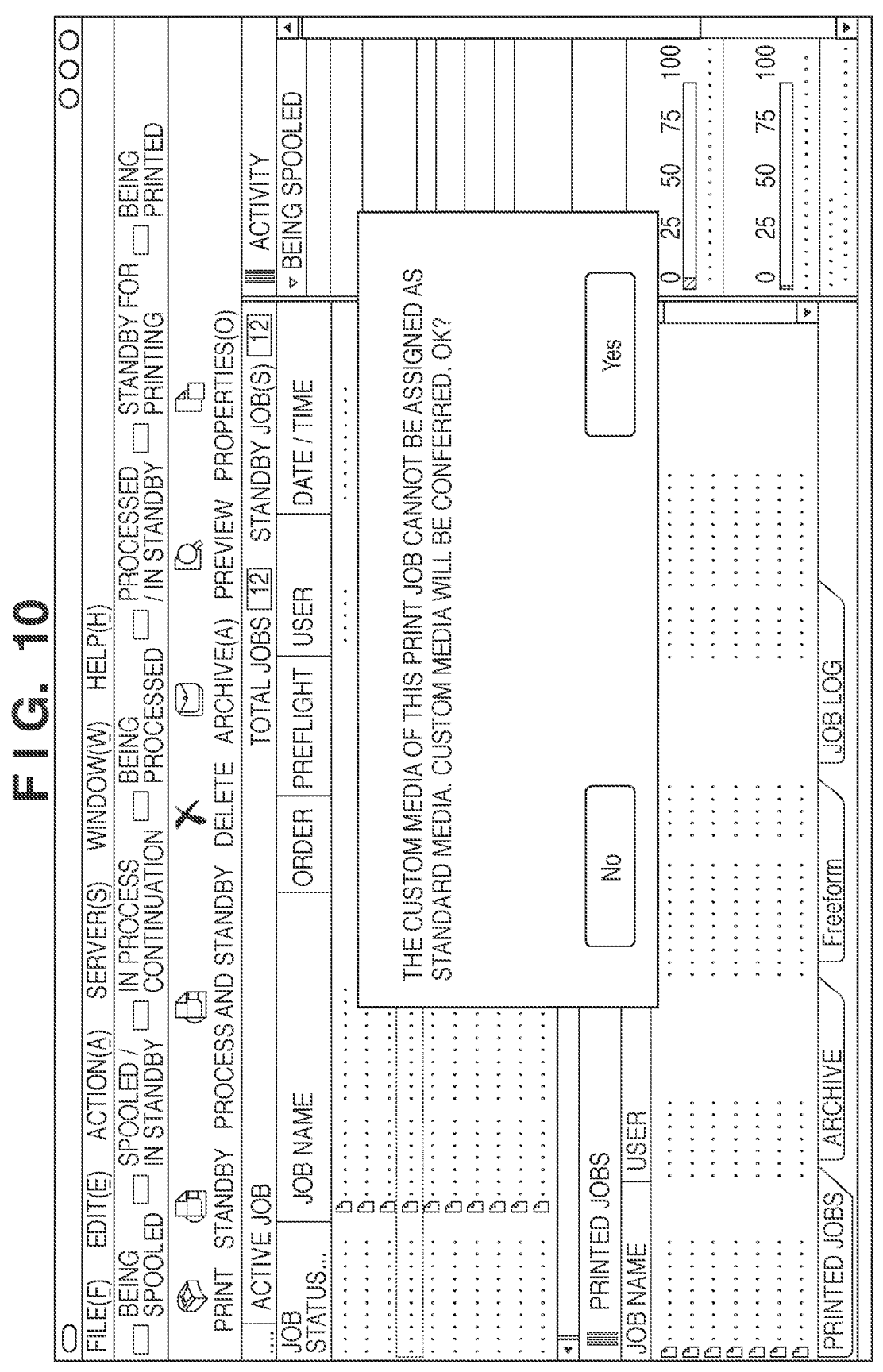

On the other hand, in a case where no corresponding standard media are available (paper types in parentheses in the mapping table) processing proceeds to S803 and a warning screen (not to be assigned as standard media) shown in FIG. 10 is displayed. Following this, in S804, a confirmation is performed as to whether to confer custom media data to the print job. Here, in a case where NO is selected, the conventional unique ID is embedded in the job ticket, and this process finishes, but in a case where YES is selected, processing proceeds to S806 and custom media data is conferred.

Conferring of Custom Media Data

Figure 11:
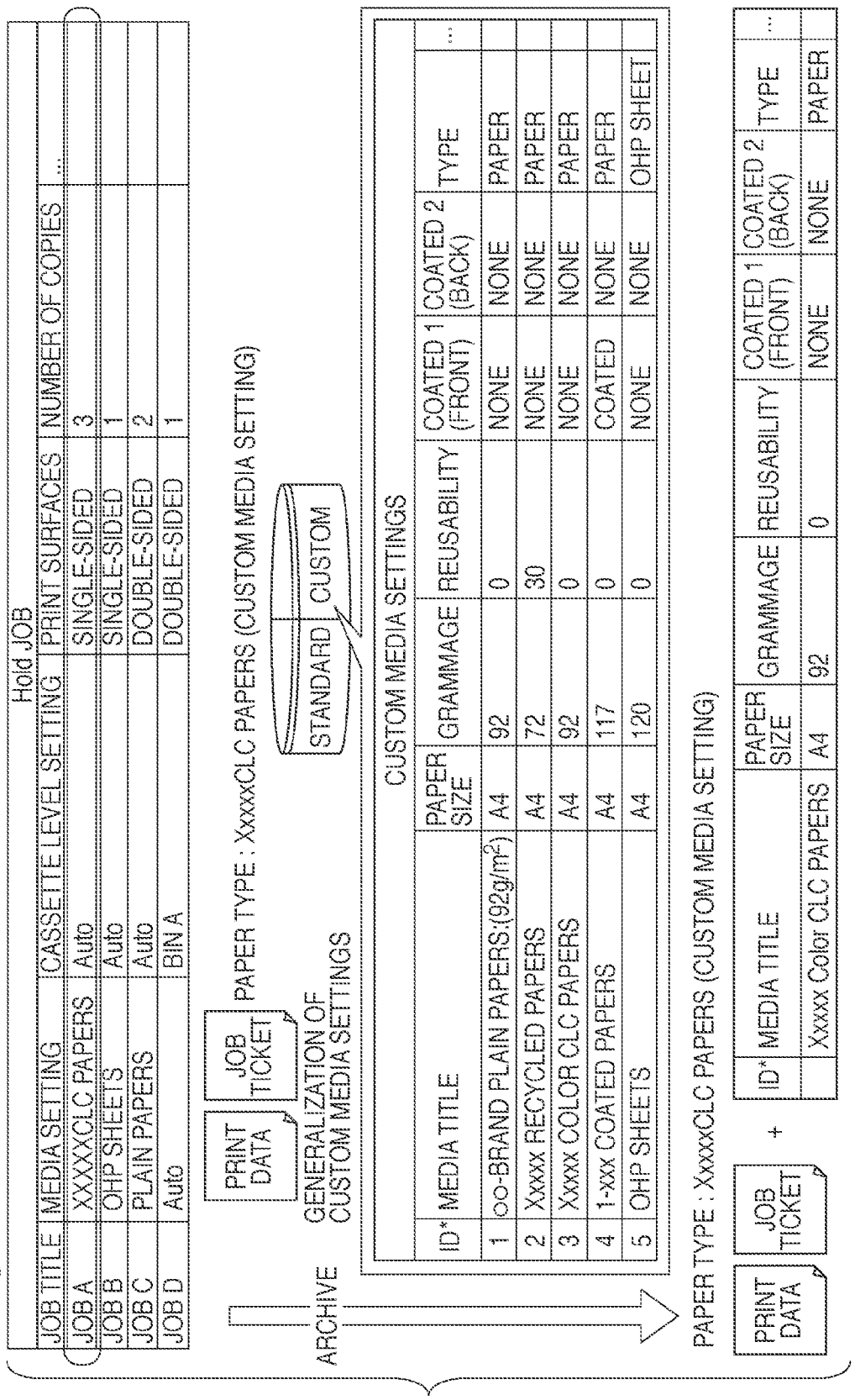
FIG. 11 is a conceptual diagram showing a conferring of custom media data.

Here, description is given using FIG. 11 and FIG. 12 of a process of conferring custom media data. FIG. 11 is a conceptual diagram showing a conferring of custom media data, and FIG. 12 is a flowchart showing a process of conferring custom media data.

First, in S1201, in a case of processing attribute values for which standard media cannot be set in archive processing, the paper type used in printing is read in from the job ticket by the print instruction interpreting unit 103. Following this, in S1202, if the values that are set are for custom media, custom media data such as a title is searched for from the unique ID of the job ticket. Next, in S1203, the unique ID from the extracted media data is made blank. Then, in S1204, the extracted media data is conferred to the print job (print data+ job ticket) (FIG. 11).

Reading (Importing) of Custom Media Data

Figure 13:
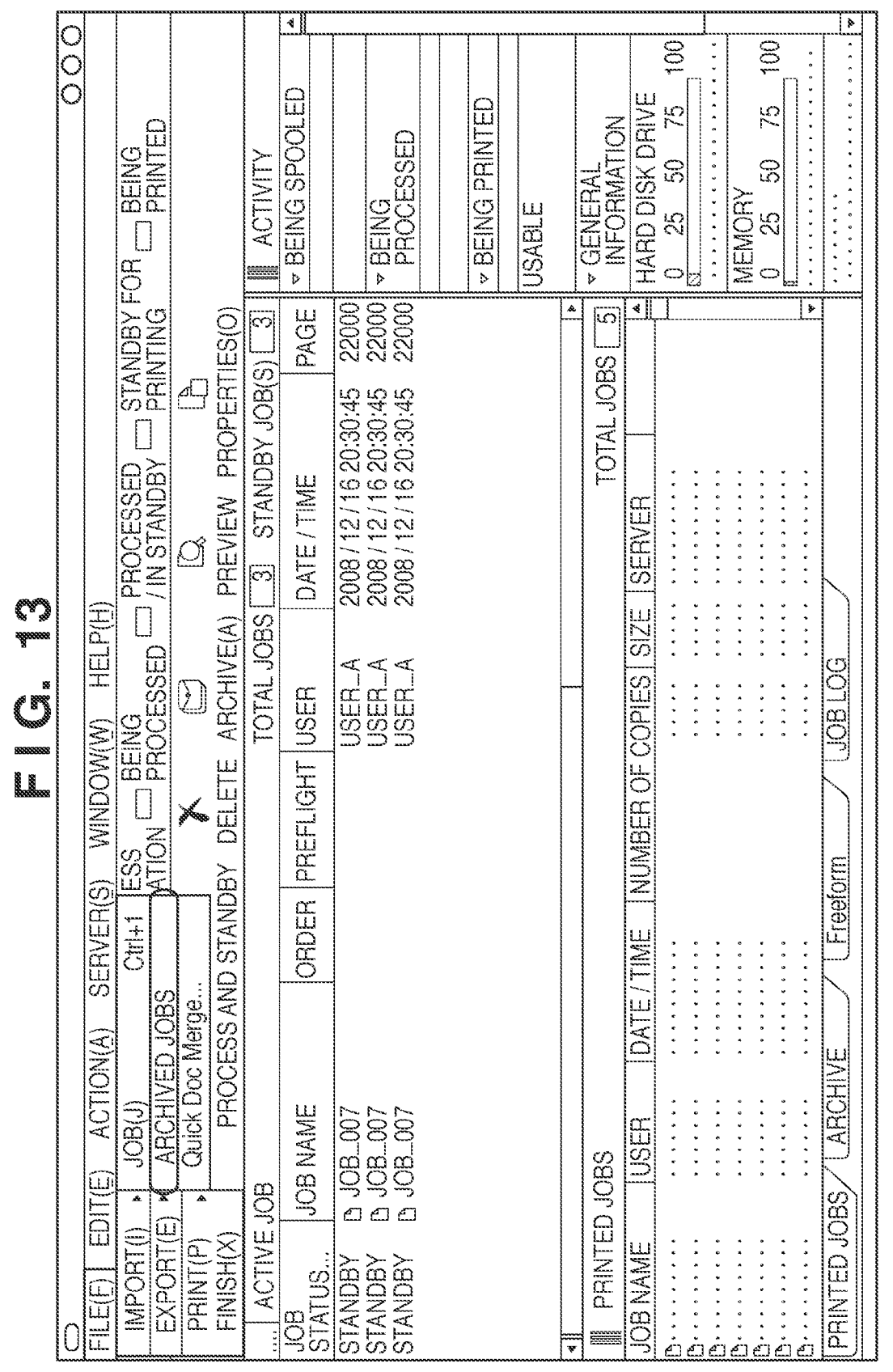
Figure 14:
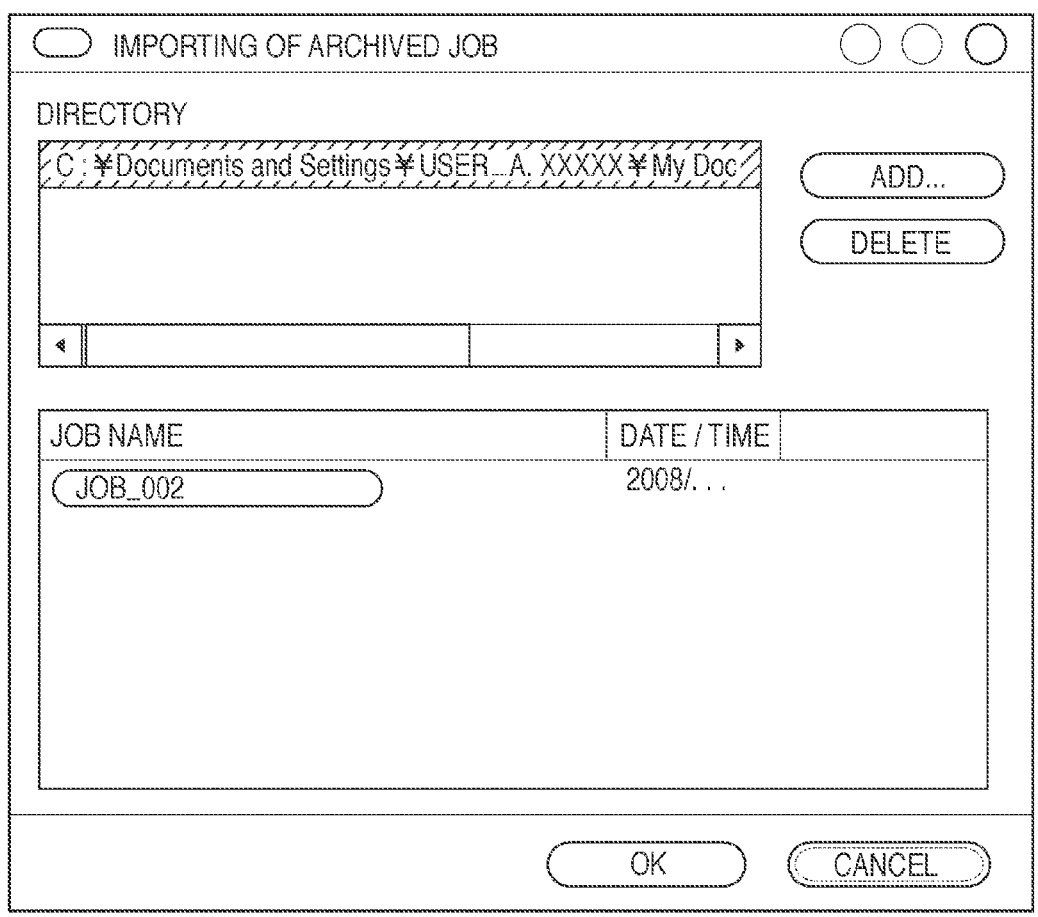
FIG. 14 is a diagram showing a screen that is displayed when importing of an archived job is selected.
Figure 15:
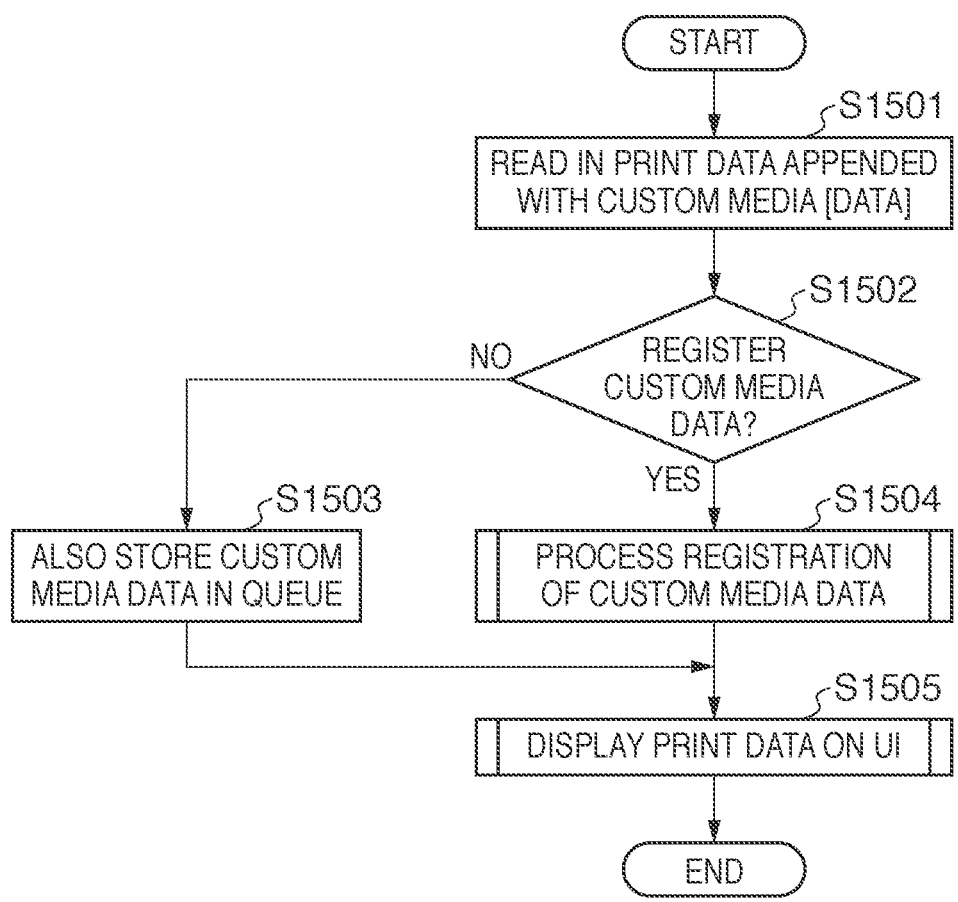
FIG. 15 is a flowchart showing a process of reading custom media data.

Next, description is given of a process of reading (importing) the archived job at another image forming apparatus. FIG. 13 is a diagram showing a UI screen in which an import of an archived job is carried out by a status display application. FIG. 14 is a diagram showing a screen that is displayed when importing of an archived job is selected at FIG. 13. FIG. 15 is a flowchart showing a process of reading custom media data.

At S1501, the user selects to read an archived job (a job conferred with custom media data) from a UI screen shown in FIG. 13. The print information control unit 102 determines whether or not the job selected at the UI screen shown in FIG. 14 is a job appended with custom media data. In a case where it is a job appended with custom media data as a result of this determination, a warning screen as shown in FIG. 16 is displayed on the display unit 112 in S1502, and a confirmation is performed as to how the user will use (reprint) the print data of the job that has been read in.

Here, in a case where the user selects to reprint in a temporary manner, processing proceeds to S1503, and not only the print data 116 and the job ticket 117, but also the custom media data are read into the print information storage unit 108. On the other hand, in a case where the user selects to permanently use the custom media data that has been conferred to the print job, processing proceeds to S1504 and this custom media data is additionally registered in the media settings. More details of this registration process are described later. Then, in S1505, the print data is displayed on the UI screen.

Registration of Custom Media Data

Figure 17:
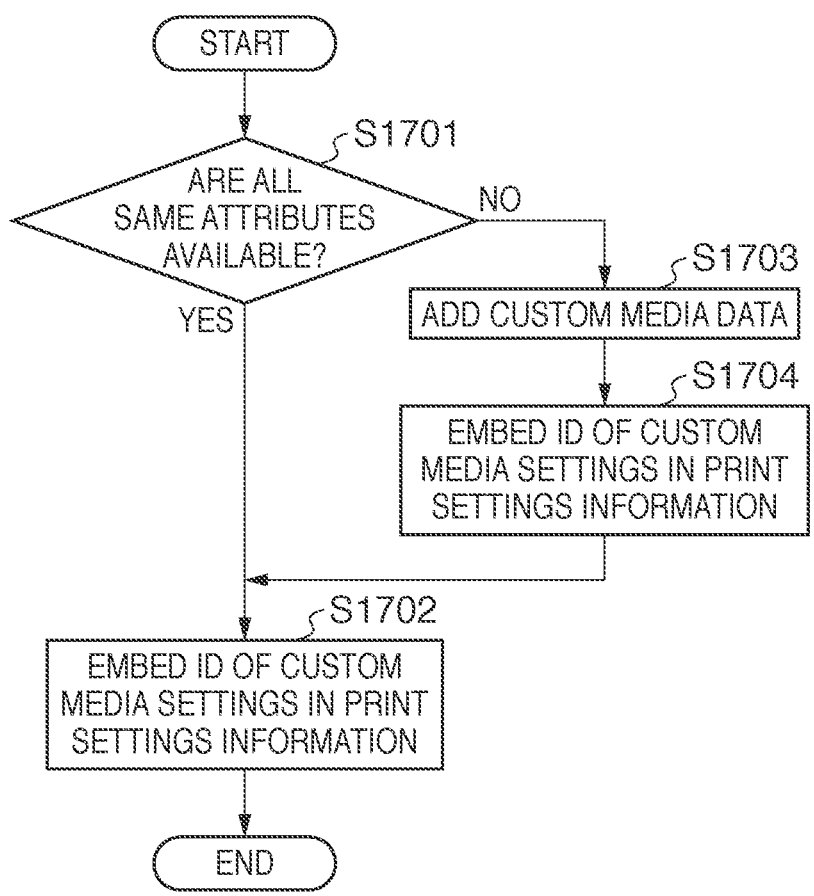
FIG. 17 is a flowchart showing a process of registering custom media data.

FIG. 17 is a flowchart showing a process of registering custom media data. First, in S1701, a determination is performed as to whether or not same-attribute custom media information is available in another image forming apparatus. If as a result of the determination this is available, processing proceeds to S1702, and the ID of the custom media information is embedded in the job ticket based on the custom media information of the other image forming apparatus.

Furthermore, in a case where as a result of the determination in S1701 there is no completely same custom media data available, processing proceeds to S1703 and the custom media data is added to the custom 111 of the other image forming apparatus. Then, in S1704, the unique ID of the other image forming apparatus that was set during the addition is embedded in the job ticket.

Displaying a Print Job Conferred with Custom Media Data

FIG. 18 is a diagram showing a state on the UI screen in which print data appended with custom media data has been read in. FIG. 19 is a flowchart showing a process of displaying print data appended with custom media data.

First, in S1901, a status display application confirms whether or not the custom media data is entered in the queue when archived print data has been read in. Here, in a case where custom media data is stored together with the print job, processing proceeds to S1902, and a check icon is applied and displayed in the job display as shown by numeral 1801 in FIG. 18. On the other hand, in a case where this is the print job only as a result of the confirmation in S1901, processing proceeds to S1903, and the job is displayed without applying a check icon.

Adding Custom Media Data from the UI

Figure 21:
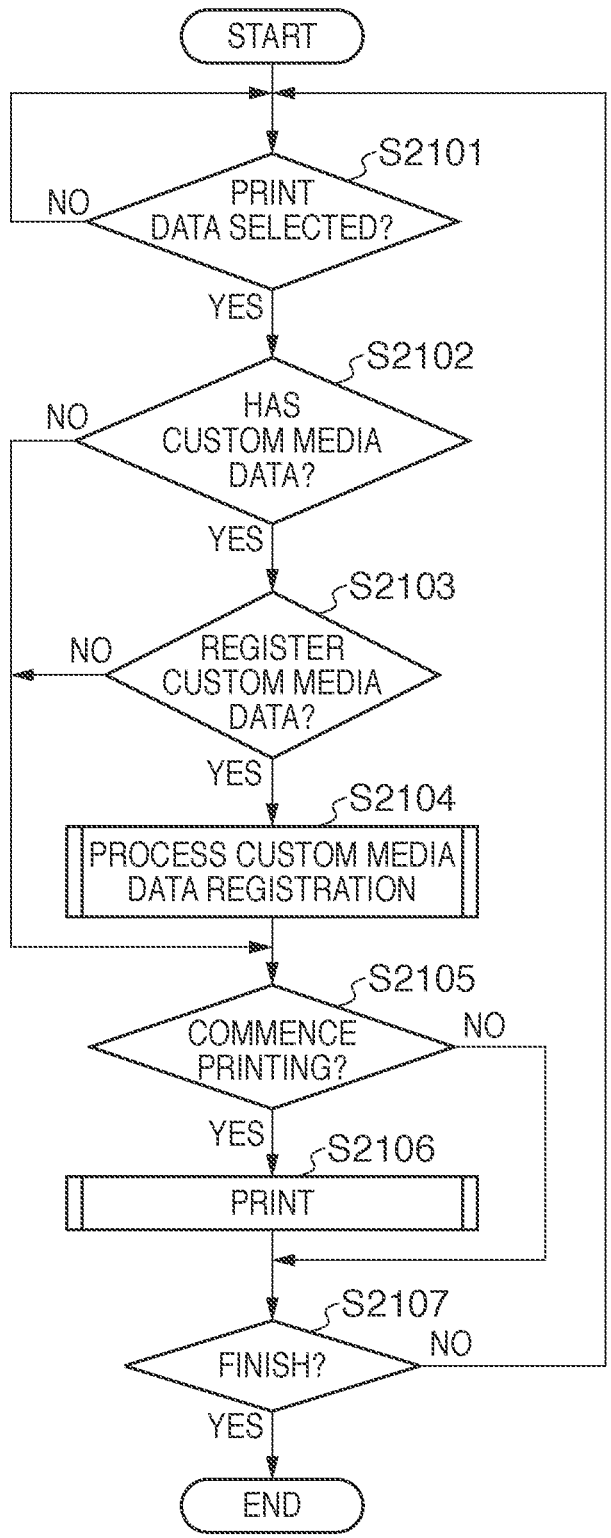
FIG. 21 is a flowchart showing a process in which printing is performed by adding custom media data from the UI screen.

FIG. 20 is a diagram showing a UI screen when registering custom media data. FIG. 21 is a flowchart showing a process in which custom media data is added from the UI screen and then printing is performed.

First, when print data is selected as S2101, processing proceeds to S2102, and a determination is performed as to whether or not the selected print data is a job appended with custom media data. This determination is a determination of whether or not the check icon 1801 shown in FIG. 18 is applied. In a case where a job appended with custom media data has been selected, registration of the custom media data is selectable by a right click as shown by numeral 2001 in FIG. 20. Then, in S2103, a determination is performed as to whether registration of the custom media data has been selected. In a case where a result is that registration of the custom media data has been selected, processing proceeds to S2104 and the above-described registration process is carried out, then processing proceeds to S2105. On the other hand, in a case of NO in S2102 or S2103, processing proceeds as it is to S2105.

At S2105, a determination is performed as to whether or not print commencement has been instructed, and when print commencement has been instructed, processing proceeds to S2106 and the print instruction interpreting unit 103 interprets the custom media data that is stored in the print information storage unit 108 to carry out printing. Then, in S2107, a determination is performed as to whether or not completion of this process has been instructed, and if completion has not been instructed, processing returns to S2101 and the above-described processing is repeated.

It should be noted that the present embodiment showed the process of converting to standard media and the process of conferring custom media data being carried out within the same image forming apparatus, but as another embodiment it is also possible to carry out only the standard media conversion. Here, in a case where conversion to standard media cannot be achieved, the unique ID is stored as it is. Furthermore, as another embodiment it is also possible to carry out only the process of conferring custom media data.

With the present embodiment, by converting the settings of custom media to settings of standard media for storing, it is possible to avoid inconveniences that occur when reprinting on another image forming apparatus a print job for which printing was carried out using custom media. In this way, settings that are suited under favorable conditions to papers used in a particular image forming apparatus can be reused in another image forming apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-218002, filed Sep. 18, 2009 which is hereby incorporated by reference herein in its entirety.

What is claimed is:

1. An image forming apparatus for printing based on a print job, comprising:
    a management unit that manages a characteristic of a custom media;
    an input unit that inputs a print job with setting information containing media identification information for identifying a media which is to be used;
    a determination unit that determines whether a media identified using the media identification information is a standard media or a custom media;
    a conversion unit that, in a case where the media identified using the media identification information is the custom media, determines a standard media based on the characteristic of the custom media and converts the setting information to a setting of the standard media that can be printed by another image forming apparatus; and
    a storage unit that stores the print job including the setting information that has been converted by the conversion unit,
    wherein in a case where the setting information of the custom media has been converted to a setting of a standard media that can be printed by the another image forming apparatus, the print job including media identification information of the standard media is stored in the storage unit,
    wherein in a case where the setting information of the custom media has not been converted to a setting of a standard media, media identification information is made blank, and the print job including the setting information of the custom media is stored in the storage unit, wherein in a case where the print job including media identification information of the standard media is read when another image forming apparatus reads the print job stored in the storage unit, the print job is performed as the standard media, and wherein in a case where the print job in which media identification information is blank is read when another image forming apparatus reads the print job stored in the storage unit, a unique identifier of the another image forming apparatus is embedded in the setting information of the custom media.

2. The apparatus according to claim 1, further comprising a unit that confirms with a user by displaying on a display unit whether to convert the setting information to the setting of the standard media.

3. The apparatus according to claim 1, wherein the conversion unit converts the setting information to the setting of the standard media for which the standard media is to be used according to a type, surface property, and grammage of the characteristic of the custom media.

4. A processing method of an image forming apparatus for printing based on a print job, comprising:

managing a characteristic of a custom media;

inputting a print job with setting information containing media identification information for identifying a media which is to be used;

determining whether a media identified using the media identification information is a standard media or a custom media;

in a case where the media identified using the media identification information is the custom media, determining a standard media based on the characteristic of the custom media and converting the setting information to a setting of the standard media that can be printed by another image forming apparatus; and storing, in a storage unit, the print job including the setting information that has been converted in the converting step, wherein in a case where the setting information of the custom media has been converted to a setting of a standard media that can be printed by the another image forming apparatus, the print job including media identification information of the standard media is stored in the storage unit, wherein in a case where the setting information of the custom media has not been converted to a setting of a standard media, media identification information is made blank, and the print job including the setting information of the custom media is stored in the storage unit, wherein in a case where the print job including media identification information of the standard media is read when another image forming apparatus reads the print job stored in the storage unit, the print job is performed as the standard media, and wherein in a case where the print job in which media identification information is blank is read when another image forming apparatus reads the print job stored in the storage unit, a unique identifier of the another image forming apparatus is embedded in the setting information of the custom media.

5. A non-transitory computer-readable storage medium storing a program for executing on a computer each step in a processing method of an image forming apparatus according to claim 4.

* * * * *